United States Patent
Chen

(10) Patent No.: US 9,970,538 B2
(45) Date of Patent: May 15, 2018

(54) METHOD FOR CONTROLLING AN ELECTROMECHANICAL INTERFACE DEVICE

(71) Applicant: Dura Operating, LLC, Auburn Hills, MI (US)

(72) Inventor: Yuchen Chen, Rochester Hills, MI (US)

(73) Assignee: DURA Operating, LLC, Auburn Hills, MI (US)

( * ) Notice: Subject to any disclaimer, the term of this patent is extended or adjusted under 35 U.S.C. 154(b) by 110 days.

(21) Appl. No.: 15/154,460

(22) Filed: May 13, 2016

(65) Prior Publication Data

US 2017/0328468 A1 Nov. 16, 2017

(51) Int. Cl.
| | |
|---|---|
| *F16H 61/24* | (2006.01) |
| *F16H 59/08* | (2006.01) |
| *G05G 1/08* | (2006.01) |
| *G05G 5/03* | (2008.04) |

(52) U.S. Cl.
CPC ............ *F16H 61/24* (2013.01); *F16H 59/08* (2013.01); *G05G 1/08* (2013.01); *G05G 5/03* (2013.01); *F16H 2061/241* (2013.01)

(58) Field of Classification Search
CPC .... F16H 61/24; F16H 59/08; F16H 2061/241; G05G 1/08; G05G 5/03
See application file for complete search history.

(56) References Cited

U.S. PATENT DOCUMENTS

| | | | |
|---|---|---|---|
| 2,881,631 A | 4/1959 | Riccius | |
| 6,550,351 B1 * | 4/2003 | O'Reilly | F16H 59/105 |
| | | | 74/335 |
| 6,851,326 B2 * | 2/2005 | Wild | F16H 61/2807 |
| | | | 74/335 |
| 8,170,757 B2 | 5/2012 | Furhoff et al. | |
| 8,413,536 B2 * | 4/2013 | Giefer | B60K 37/06 |
| | | | 200/61.91 |
| 8,548,696 B2 | 10/2013 | Jerger et al. | |
| 9,140,353 B2 * | 9/2015 | Meyer | B60K 37/06 |
| 9,777,813 B2 * | 10/2017 | Rake | F16H 27/06 |
| 2001/0005816 A1 * | 6/2001 | Kusafuka | F16H 59/08 |
| | | | 702/96 |
| 2003/0094328 A1 * | 5/2003 | Esly | F16H 61/28 |
| | | | 180/364 |
| 2005/0257637 A1 * | 11/2005 | Osamura | F16H 61/32 |
| | | | 74/473.1 |
| 2007/0279401 A1 | 12/2007 | Ramstein et al. | |

(Continued)

FOREIGN PATENT DOCUMENTS

| | | | | |
|---|---|---|---|---|
| DE | 10029191 A1 | 12/2001 | | |
| EP | 2031283 A1 * | 3/2009 | ............ | F16H 61/24 |
| JP | 2002211735 A * | 7/2002 | | |

*Primary Examiner* — Tuan C To
(74) *Attorney, Agent, or Firm* — Robert E. Ford; Raymond J. Vivacqua; Steven L. Crane

(57) ABSTRACT

A method of controlling an electromechanical interface includes commanding, by a controller, a motor to provide an operating torque on a selector, wherein the operating torque is based on a position of the selector relative to first and second positions, and commanding, by the controller, the motor to provide a detent torque on the selector at approximately the first position and at approximately the second position, wherein the detent torque is only applied over a first time period.

20 Claims, 2 Drawing Sheets

(56) References Cited

U.S. PATENT DOCUMENTS

| | | | |
|---|---|---|---|
| 2008/0141807 A1* | 6/2008 | Kimura | F16H 61/32 74/335 |
| 2009/0000413 A1* | 1/2009 | Furhoff | B60K 37/06 74/473.3 |
| 2012/0123653 A1* | 5/2012 | Kimura | B60W 10/06 701/54 |
| 2015/0159747 A1* | 6/2015 | Hoskins | F16H 59/0217 74/473.23 |
| 2015/0167827 A1* | 6/2015 | Fett | F16H 59/08 74/473.3 |
| 2015/0362068 A1* | 12/2015 | Heo | F16H 61/24 74/473.21 |
| 2016/0017983 A1 | 1/2016 | Levesque et al. | |
| 2016/0102761 A1* | 4/2016 | Kuwahara | F16H 61/24 74/473.12 |
| 2016/0290493 A1* | 10/2016 | Kawaguchi | F16H 59/0208 |
| 2017/0219092 A1* | 8/2017 | Kuros | F16H 59/04 |

* cited by examiner

METHOD FOR CONTROLLING AN ELECTROMECHANICAL INTERFACE DEVICE

FIELD

The invention relates generally to a method for controlling an electromechanical interface device, and more particularly to method for controlling an electromechanical interface device by generating a mechanical feel with detent stops at intervals.

BACKGROUND

The statements in this section merely provide background information related to the present disclosure and may or may not constitute prior art.

System controls for machines, such as motor vehicles, airplanes, industrial equipment, etc., include an interface device used by an operator of the machine to control the operation of the machine. These interface devices may include knobs, switches, levers, etc. A mechanical linkage may connect the interface device to the mechanism being controlled or a human machine interface (HMI) system may be used where an electromechanical interface device is in electronic communication with the mechanism to be controlled. In HMI systems the mechanical movement of the electromechanical interface device is translated into an electrical signal that is communicated to the controlled mechanism.

In both cases it is important that the interface device provide proper "feel" to the operator in order to denote specific operating positions. For example, a traditional shift control for a motor vehicle may include a shift lever mechanically linked to a transmission through a shift cable. As the shift lever is moved, the cable transmits the movement to the transmission which in turn engages different gear or operating states, such as park, neutral, drive, etc., based on this transmitted movement. In shift-by-wire systems the shift cable between the shift lever and the transmission is eliminated and instead movement of the shift lever sends a control signal to the transmission which then, based on the control signal, engages the desired gear or operating state. In both cases it is desirable to provide non-visual feedback to the user when each of the operating positions (i.e., park, neutral, reverse, drive) has been achieved.

One solution is to use a mechanical feedback mechanism having a wheel, a roller and a torsion spring to generate the required feel. While these mechanisms are useful for their intended purpose, they are inherently tailored to the specific mechanism being used. For example, a vehicle with gear positions of park, neutral, reverse, and drive while another vehicle with gear positions of park, neutral, reverse, drive, and manual will need two different mechanical feedback mechanisms in order to accommodate the additional (manual) gear selection. Adding additional parts to the mechanical feedback mechanism may require new tooling, testing on the part, testing on the sample, and testing on the vehicles, and may require new position sensors for the modified part.

One solution is to provide electromechanical feedback mechanisms that replace some of the mechanical parts of the mechanical feedback mechanism with electrically controlled mechanism. While these mechanisms are useful for their intended purpose, the electromechanical interface devices may provide a diminished user experience due to the lack of a "mechanical feel" to the device. This lack of mechanical feel is greatly compounded when the interface device is moved or operated quickly. And yet, this mechanical feel is important for tactile feedback to an operator of the electromechanical interface. Thus, there is a need in the art for an electromechanical interface device that provides sufficient tactile feedback to an operator of the device under all operating conditions and that can be used in various configurations without requiring additional mechanical parts and redesigns.

SUMMARY

A method of controlling an electromechanical interface is provided. The electromechanical interface includes a selector connected to a motor, the motor in electronic communication with a controller, and the selector moveable between at least a first position and a second position. The method includes commanding, by the controller, the motor to provide an operating torque on the selector, wherein the operating torque is based on a position of the selector relative to the first and second positions, and commanding, by the controller, the motor to provide a detent torque on the selector at approximately the first position and at approximately the second position, wherein the detent torque is only applied over a first time period.

In one aspect, the operating torque is selected from an operating torque profile that relates the operating torque to the position of the selector.

In another aspect, the operating torque profile is configured to generate a feeling of a mechanical detent selector to an operator of the selector.

In another aspect, the operating torque profile has zero operating torque at the first position, the second position, and a midpoint position between the first and the second positions.

In another aspect, the operating torque profile has a maximum operating torque between the first position and the midpoint position and between the midpoint position and the second position.

In another aspect, the detent torque is selected from a detent torque profile that relates the detent torque to the position of the selector when the selector is within an offset amount from the first position or the second position.

In another aspect, the position of the selector is measured in rotational degrees about an axis of rotation and the offset amount is less than 5 degrees.

In another aspect, the offset amount is approximately 1.65 degrees.

In another aspect, the detent torque profile has a maximum detent torque greater than the maximum operating torque.

In another aspect, a rate of change of detent torque is greater than a rate of change of operating torque.

In another aspect, the first time period is approximately less than 500 ms.

In another aspect, the first time period is approximately 100 ms.

In another aspect, the detent torque is determined by a spring damper model based on a position of the selector and a speed of the selector.

In another aspect, the first position of the selector corresponds to a first gear operating mode in a shift-by-wire system and the second position of the selector corresponds to a second gear operating mode in the shift-by-wire system.

Another method of controlling an electromechanical interface is provided. The electromechanical interface has a selector connected to a motor and rotatable between at least a first position and a second position, the motor in electronic communication with a controller. The method includes determining, by the controller, a rotational position of the selector, selecting, by the controller, an operating torque from an operating torque curve based on the rotational position of the selector, commanding, by the controller, the motor to apply the operating torque on the selector, selecting, by the controller, a detent torque from a detent torque curve based on the rotational position of the selector and a speed of rotation of the selector, and commanding, by the controller, the motor to apply the detent torque on the selector over a first time period.

In one aspect, the detent torque is applied only when the selector is within an offset amount from the first position or the second position.

In another aspect, the operating torque curve is configured to generate a feeling of a mechanical detent selector to an operator of the selector.

In another aspect, the operating torque curve has a maximum operating torque, the detent torque curve has a maximum detent torque, and the maximum detent torque is greater than the maximum operating torque.

In another aspect, the detent torque curve is defined by a spring damper model based on the position of the selector and the speed of rotation of the selector.

A shift-by-wire interface for a motor vehicle is also provided. The shift-by-wire interface includes a selector rotatable between a first shift position and a second shift position, a motor connected to the selector, and a controller in electronic communication with the motor, the controller having a processor and a non-transitory computer readable medium for storing instructions for execution by the processor. The instructions include commanding the motor to provide an operating torque on the selector, wherein the operating torque is based on a position of the selector relative to the first and second shift positions and is configured to mimic a feel of a mechanical selector, and commanding the motor to provide a detent torque on the selector at approximately the first shift position and at approximately the second shift position, wherein the detent torque is configured to mimic a feel of a mechanical detent at the first shift position and the second shift position.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
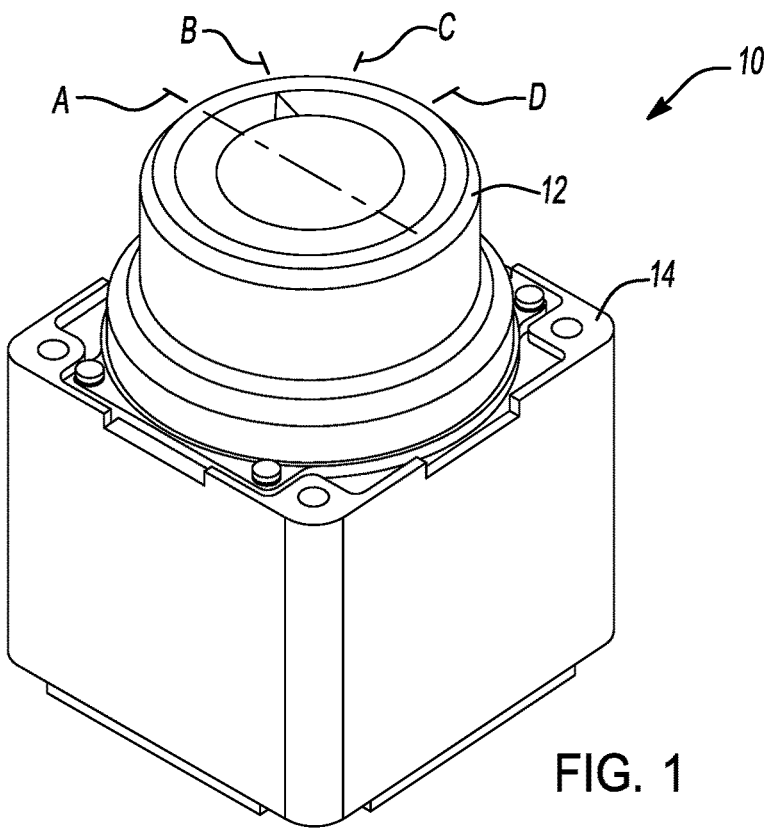
FIG. 1 is a top perspective view of an exemplary rotary electromechanical interface device.
Figure 2:
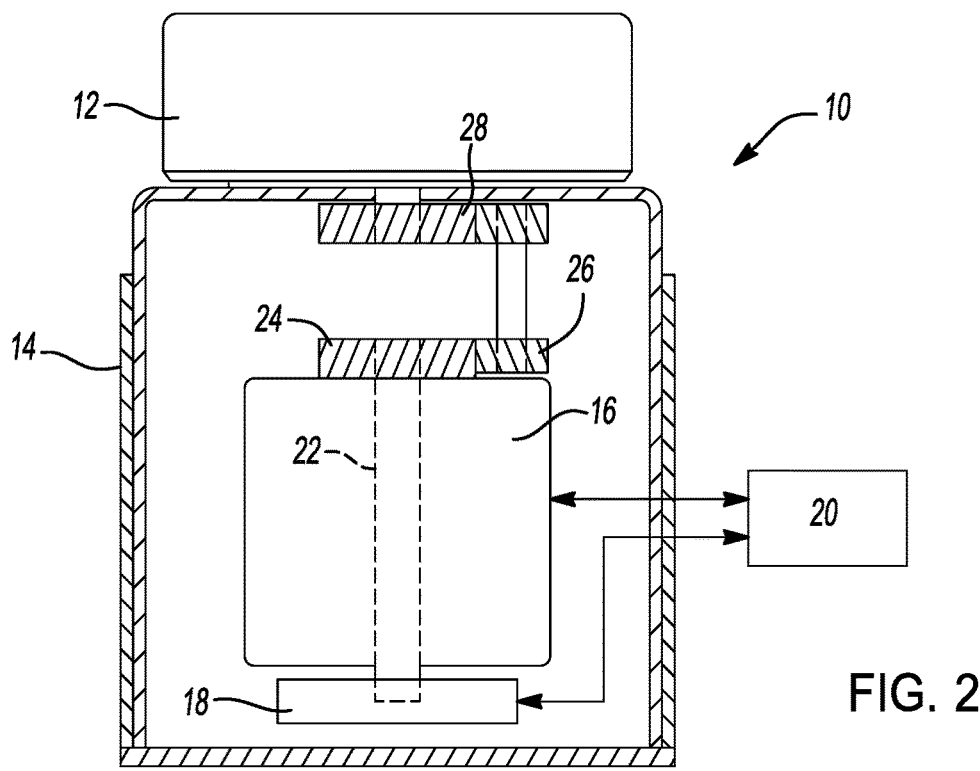
FIG. 2 is a side, partial cross-section view of the exemplary rotary electromechanical interface device.

With reference to FIGS. 1 and 2, an exemplary electromechanical interface for use with the present invention is illustrated and generally indicated by reference number 10. The electromechanical interface 10 is employed as part of a human machine interface system in any suitable machine or system, for example, a motor vehicle, an airplane, an industrial operations system, a medical device, etc. In one particular example, the electromechanical interface 10 is a rotary gear shifter used in a shift-by-wire system in a motor vehicle. Thus, the electromechanical interface 10 may be used to shift among various gears of a transmission of the motor vehicle, between transmission operating modes, such as park, neutral, reverse, or drive, or between multiple four wheel high and low drive states, etc. The electromechanical interface 10 is not directly mechanically coupled to the transmission or drive unit of the motor vehicle and instead communicates electrically with an actuator that engages the particular gear or drive state.

Generally, the electromechanical interface 10 includes a selector 12 mounted to a housing 14. In the example provided the selector 12 is a rotary selector or knob that is rotatable relative to the housing 14 by a user. For example, the selector 12 may include four positions at 30 degree rotational intervals. Each position, including a first position 'A', a second position 'B', a third position 'C', and a fourth position 'D', corresponds to one of a particular operating state. In the particular example of a shift-by-wire system, the first position 'A' may correspond to a 'park' operating state, the second position 'B' may correspond to a 'reverse' operating state, the third position 'C' may correspond to a 'neutral' operating state, and the fourth position 'D' may correspond to a 'drive' operating state. However, it should be appreciated that the electromechanical interface 10 may include fewer or more positions at various intervals suitable for the intended use. The electromechanical interface 10 may also include various other features, such as LED indicators or lighting, or secondary selectors, such as buttons or switches, that may be manipulated independently of the selector 12 to provide further control options for the user.

The electromechanical interface 10 further includes a motor 16, a position sensor 18, and a controller 20. The motor 16 may be any device configured to control, or apply a torque to, the selector 12. For example, the motor 16 may be a stepper motor. The motor 16 is electrically operated and commanded by the controller 20. In the example provided, the motor 16 includes a drive pin 22 that is driven for rotation upon application of electrical power to the motor 16. The drive pin 22 extends outwardly from the motor 16 and is coupled to the position sensor 18 and to the selector 12. The drive pin 22 may be coupled to the selector 12 in various ways without departing from the scope of the present invention. In the example provided, a gear 24 is coupled to the drive pin 22. The gear 24 is in mesh with a transfer gear 26. The transfer gear 26 is in mesh with a gear 28 connected to the selector 12. Thus, rotation of the selector 12 causes rotation of the gears 28, 26, 24 and the drive pin 22 and rotation of the drive pin 22 by the motor 16 in turn rotates the gears 24, 26, 28 and the selector 12. As will be described in greater detail below, the motor 16 may be operated to provide a desired force output to the selector 12, or a torque on the selector 12, based on a position of the selector 12.

The position sensor 18 may be any component capable of determining at least certain positions of the selector 12. In the example provided, the position sensor 18 senses or detects a rotational position of the drive pin 22 which, via the fixed gears 24, 26, 28, is associated with a rotational position of the selector 12. The position sensor 18 may be an optical encoder sensor, potentiometer, magnetic sensor, or any other type of sensor capable of detecting the rotational position of the selector 12. The position sensor 18 is in electronic communication with the controller 20.

The controller 20 is a non-generalized, electronic control device having a preprogrammed digital computer or processor, a memory or non-transitory computer readable medium, and at least one input/output peripheral or port. The processor is capable of executing control logic or instructions stored in the memory based on data signals received from the position sensor 18 and is capable of commanding operation of the motor 16.

Figure 3:
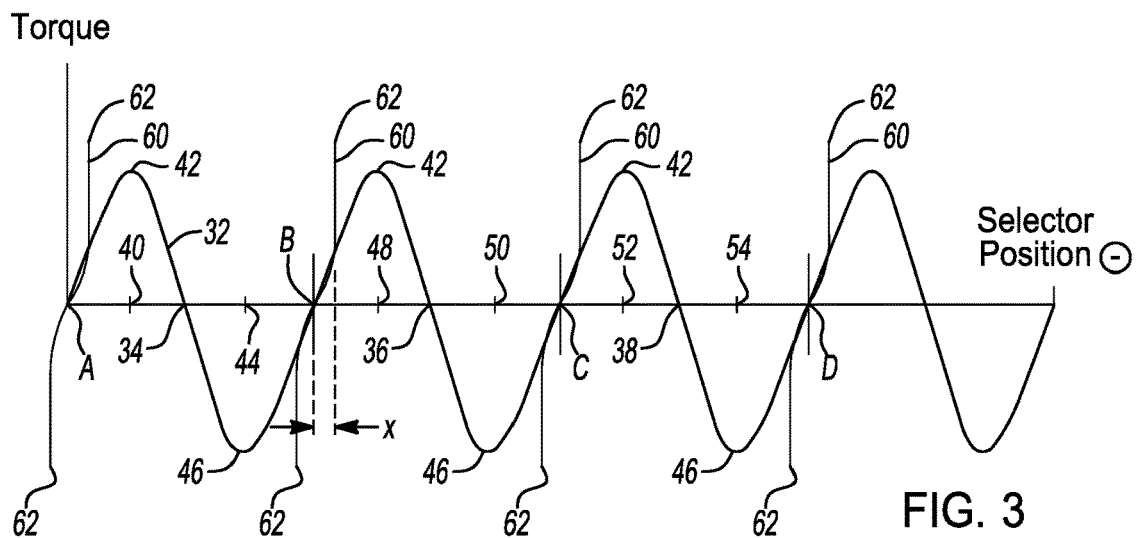
FIG. 3 is a graph illustrating a control method used with the exemplary rotary electromechanical interface device.

Turning now to FIG. 3, a method for controlling the electromechanical interface 10 will now be described. FIG. 3 illustrates a graph of torque applied to the selector 12 in a Cartesian coordinate system. The vertical axis of the graph is torque applied to the selector 12 by the motor 16. The sign of the torque, i.e. positive or negative, determines the rotational direction in which the torque is applied to the selector 12. The horizontal axis of the graph is the rotational position of the selector 12 in degrees. Generally, the controller 20 commands the motor 16 to provide an operating torque on the selector 12. The normal operating torque is shown in the graph by a normal operating torque profile or curve indicated by reference number 32. The torque applied to the selector 12 at any given time is determined by the rotational position of the selector 12. The normal operating torque curve 32 is preferably sinusoidal and is customized to mimic or copy the feel of a mechanical selector. For example, at rotational positions A, B, C, and D, the torque applied to the selector 12 is normally zero. At midway rotational positions, indicated by reference numbers 34, 36, and 38, located midway between the rotational positions A, B, C, and D, respectively, the torque applied to the selector 12 is also normally zero. At a rotational position 40 located midway between rotational position A and midpoint 34, the normal operating torque curve 32 reaches a maximum operating torque 42. At a rotational position 44 located midway between rotational position B and midpoint 34, the normal operating torque curve 32 reaches a maximum operating torque 46 (applied in the opposite direction to maximum operating torque 42). At a rotational position 48 located midway between rotational position B and midpoint 36, the normal operating torque curve 32 reaches the maximum operating torque 42. At a rotational position 50 located midway between rotational position C and midpoint 36, the normal operating torque curve 32 reaches the maximum operating torque 46. At a rotational position 52 located midway between rotational position C and midpoint 38, the normal operating torque curve 32 reaches the maximum operating torque 42. At a rotational position 54 located midway between rotational position D and midpoint 38, the normal operating torque curve 32 reaches the maximum operating torque 46. However, it should be appreciated that the normal operating torque curve 32 may have various other profiles or shapes without departing from the scope of the present invention.

In addition to the normal operating torque, the controller 20 commands the motor 16 to provide a detent torque on the selector 12. The detent torque overrides the normal operating torque. The detent torque is shown in the graph by detent torque profiles or curves indicated by reference number 60. The detent torque is applied only at approximately the positions A, B, C, and D over a predefined time period. For example, the detent torque curve 60 relates the detent torque to the position of the selector 12 when the selector 12 is within an offset amount 'x' from one of the positions A, B, C, and D. In one example, the offset amount is within 5+/−rotational degrees of one of the positions A, B, C, and D. In another example, the offset amount is within 3+/−rotational degrees of one of the positions A, B, C, and D. In a preferred example, the offset amount is within 1.65+/−rotational degrees of one of the positions A, B, C, and D. In one example, the size of the offset is based on a speed of rotation of the selector 12, wherein a higher rotational speed results in a smaller offset amount. The detent torque is applied up to a maximum detent torque 62.

The detent torque curve 60 is defined by a spring damper model based on the following equation:

$$T = k\theta + d\theta' \tag{1}$$

wherein T is the torque applied to the selector 12 by the motor 16, k is a spring constant, d is a damper constant, $\theta$ is the position of the selector 12, within the offset amount x, in rotational degrees from one of the positions A, B, C, and D, and $\theta'$ is the speed of the selector 12 (i.e. how fast the selector 12 is rotated when within the offset amount). In addition, the time period over which the detent torque is applied is set to a relatively short amount. For example, the time period is approximately less than 500 ms. In another example, the time period is approximately less than 300 ms. In a preferred example, the time period is approximately 100 ms. The detent torque curve 60 is configured such that the maximum detent torque 62 is greater than the maximum operating torque 42. In addition, a rate of change of the detent torque is greater than a rate of change of the operating torque. Thus, the detent torque provides a short, sharp detent feel at approximately each of the positions A, B, C, and D.

Figure 4:
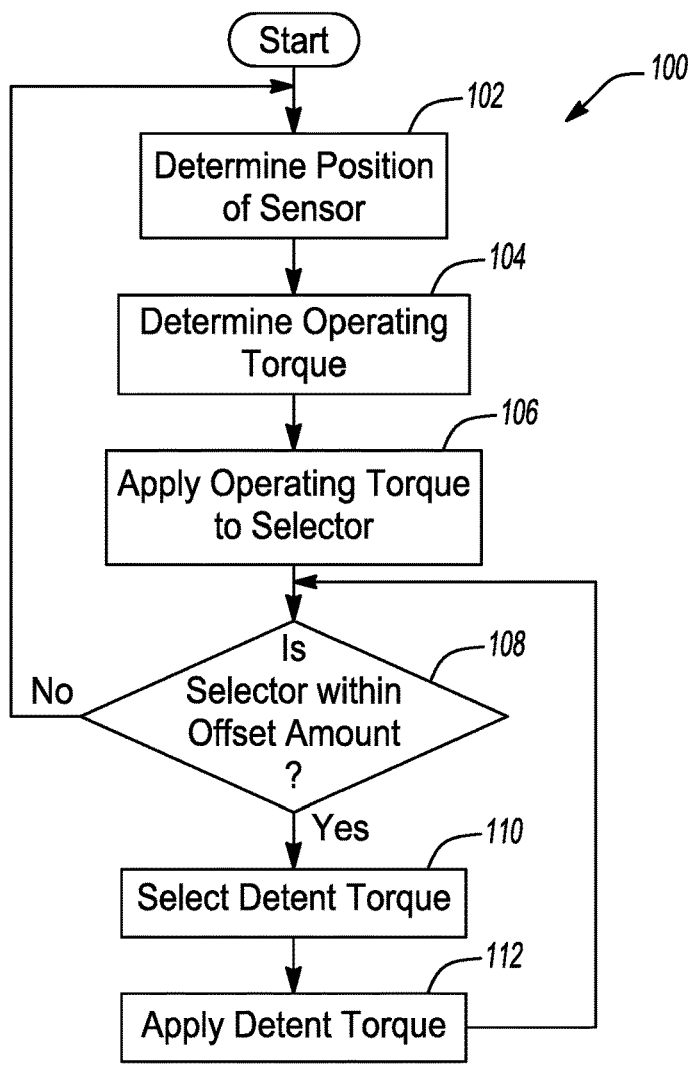
FIG. 4 is a flow chart illustrating the control method.

Turning to FIG. 4, and with continued reference to FIGS. 1-3, a method for controlling the electromechanical interface 10 is shown in a flow diagram and generally indicated by reference number 100. The method 100 begins at step 102 where the controller 20 determines a position of the selector 12. The position of the selector 12 is determined by data sensed from the position sensor 18. The position of the selector 12 may be measured as rotational degrees from a start or reference position, such as position A.

Next, at step 104, the controller 20 determines an operating torque from the normal operating torque curve 32. The operating torque is determined based on the position of the selector 12. At step 106 the controller 20 commands the motor 16 to apply the operating torque to the selector 12.

At step 108 the controller 20 determines whether the selector 12 is within the offset amount x from one of a set of predefined positions corresponding to selectable modes. In the example provided, the predefined positions are positions A, B, C, and D. If the selector 12 is not within the offset amount x of one of the positions A, B, C, and D, the method 100 returns to step 102 and repeats. If, however, the selector 12 is within the offset amount x of one of the positions A, B, C, and D, then the method 100 proceeds to step 110 where the controller 20 selects a detent torque from the detent torque curve 60. The detent torque is selected based on the position of the selector 12 within the offset amount. The method 100 then proceeds to step 112 where the controller 20 commands the motor 16 to apply the detent torque to the selector 12 and the motor 16 applies the detent torque over the time period.

The description of the invention is merely exemplary in nature and variations that do not depart from the gist of the invention are intended to be within the scope of the invention. Such variations are not to be regarded as a departure from the spirit and scope of the invention.

The following is claimed:

1. A method of controlling an electromechanical interface, the electromechanical interface having a selector connected to a motor, the motor in electronic communication with a controller, and the selector moveable between at least a first position and a second position, the method comprising:
   commanding, by the controller, the motor to provide an operating torque on the selector, wherein the operating torque is based on a position of the selector relative to the first and second positions; and
   commanding, by the controller, the motor to provide a detent torque on the selector at approximately the first position and at approximately the second position, wherein the detent torque is only applied over a first time period.

2. The method of claim 1 wherein the operating torque is selected from an operating torque profile that relates the operating torque to the position of the selector.

3. The method of claim 2 wherein the operating torque profile is configured to generate a feeling of a mechanical detent selector to an operator of the selector.

4. The method of claim 2 wherein the operating torque profile has zero operating torque at the first position, the second position, and a midpoint position between the first and the second positions.

5. The method of claim 4 wherein the operating torque profile has a maximum operating torque between the first position and the midpoint position and between the midpoint position and the second position.

6. The method of claim 5 wherein the detent torque is selected from a detent torque profile that relates the detent torque to the position of the selector when the selector is within an offset amount from the first position or the second position.

7. The method of claim 6 wherein the position of the selector is measured in rotational degrees about an axis of rotation and the offset amount is less than 3 degrees.

8. The method of claim 7 wherein the offset amount is 1.65 degrees.

9. The method of claim 6 wherein the detent torque profile has a maximum detent torque greater than the maximum operating torque.

10. The method of claim 1 wherein the first time period is less than 500 ms.

11. The method of claim 10 wherein the first time period is 100 ms.

12. The method of claim 1 wherein the detent torque is determined by a spring damper model based on a position of the selector and a speed of the selector.

13. The method of claim 1 wherein the first position of the selector corresponds to a first gear operating mode in a shift-by-wire system and the second position of the selector corresponds to a second gear operating mode in the shift-by-wire system.

14. The method of claim 1 wherein the detent torque is selected from a detent torque curve based on the rotational position of the selector.

15. A method of controlling an electromechanical interface, the electromechanical interface having a selector connected to a motor, the motor in electronic communication with a controller, and the selector moveable between at least a first position and a second position, the method comprising:
   commanding, by the controller, the motor to provide an operating torque on the selector, wherein the operating torque is based on a position of the selector relative to the first and second positions; and
   commanding, by the controller, the motor to provide a detent torque on the selector at approximately the first position and at approximately the second position, wherein the detent torque is only applied over a first time period, and wherein a rate of change of detent torque is greater than a rate of change of operating torque.

16. A method of controlling an electromechanical interface, the electromechanical interface having a selector connected to a motor and rotatable between at least a first position and a second position, the motor in electronic communication with a controller, the method comprising:
   determining, by the controller, a rotational position of the selector;
   selecting, by the controller, an operating torque from an operating torque curve based on the rotational position of the selector;
   commanding, by the controller, the motor to apply the operating torque on the selector;
   selecting, by the controller, a detent torque from a detent torque curve based on the rotational position of the selector and a speed of rotation of the selector; and
   commanding, by the controller, the motor to apply the detent torque on the selector over a first time period.

17. The method of claim 16 wherein the detent torque is applied only when the selector is within an offset amount from the first position or the second position.

18. The method of claim 16 wherein the operating torque curve is configured to generate a feeling of a mechanical detent selector to an operator of the selector.

19. The method of claim 16 wherein the operating torque curve has a maximum operating torque, the detent torque curve has a maximum detent torque, and the maximum detent torque is greater than the maximum operating torque.

20. The method of claim 16 wherein the detent torque curve is defined by a spring damper model based on the position of the selector and the speed of rotation of the selector.

* * * * *